Sept. 19, 1944.   A. LANGSNER   2,358,522
DRAFTING APPARATUS
Filed May 8, 1939   3 Sheets-Sheet 1
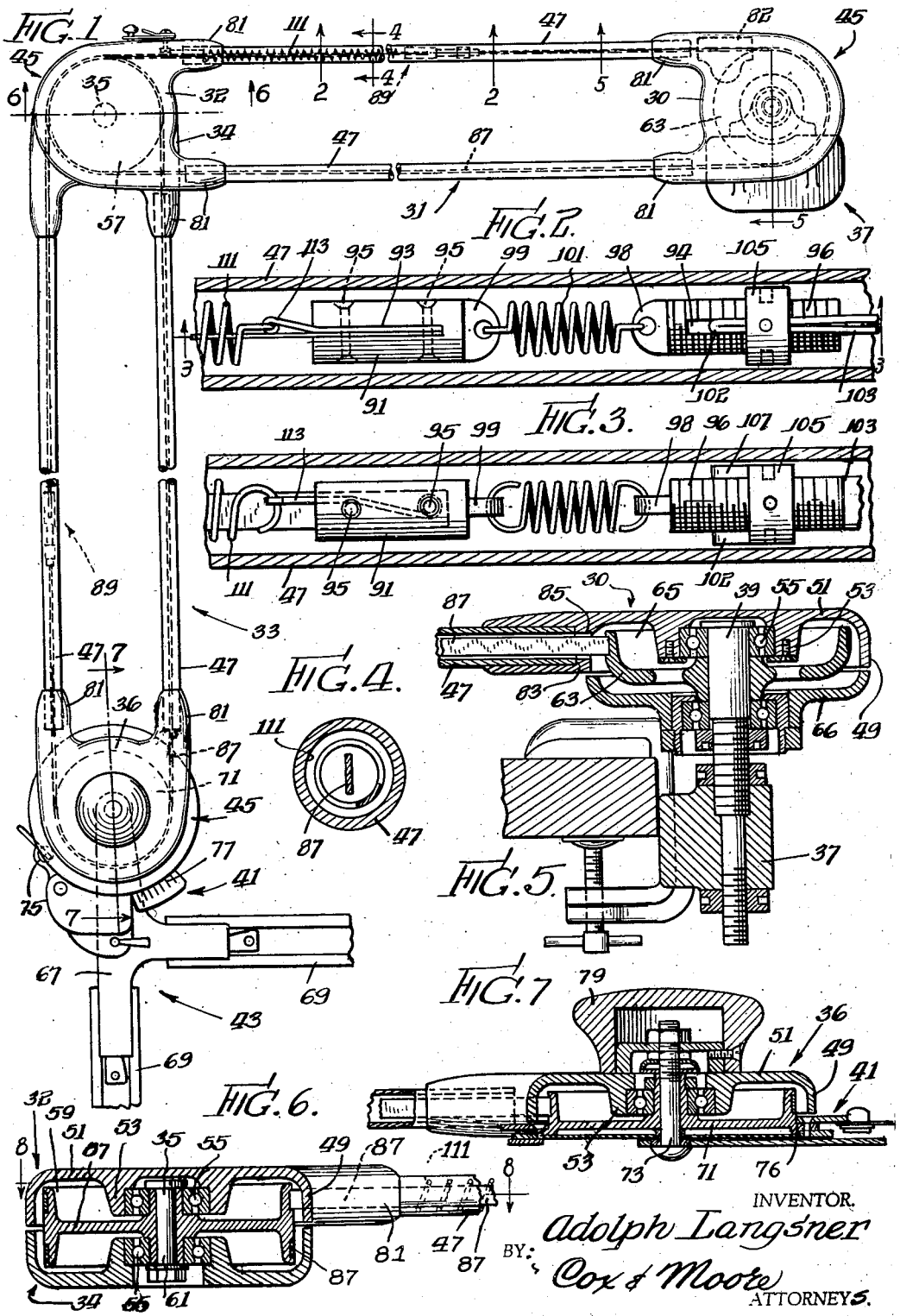
INVENTOR.
Adolph Langsner
BY Cox & Moore
ATTORNEYS.

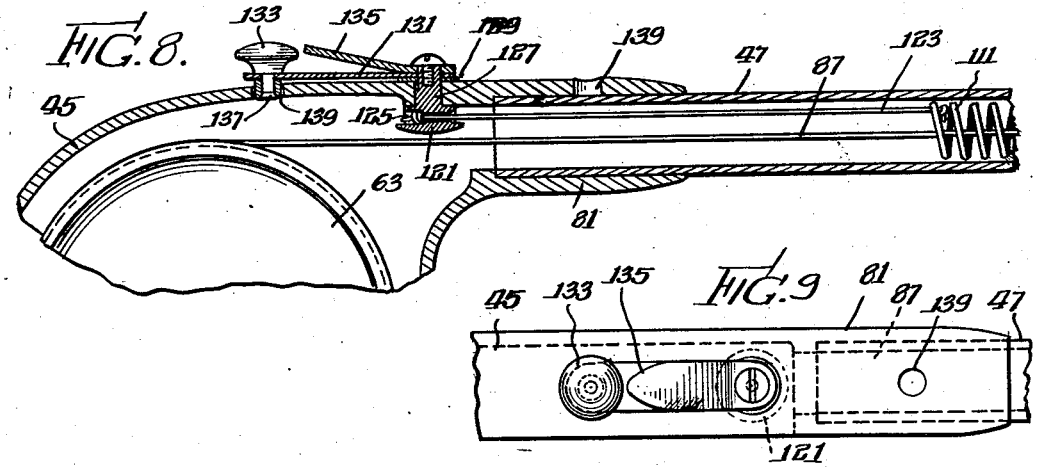
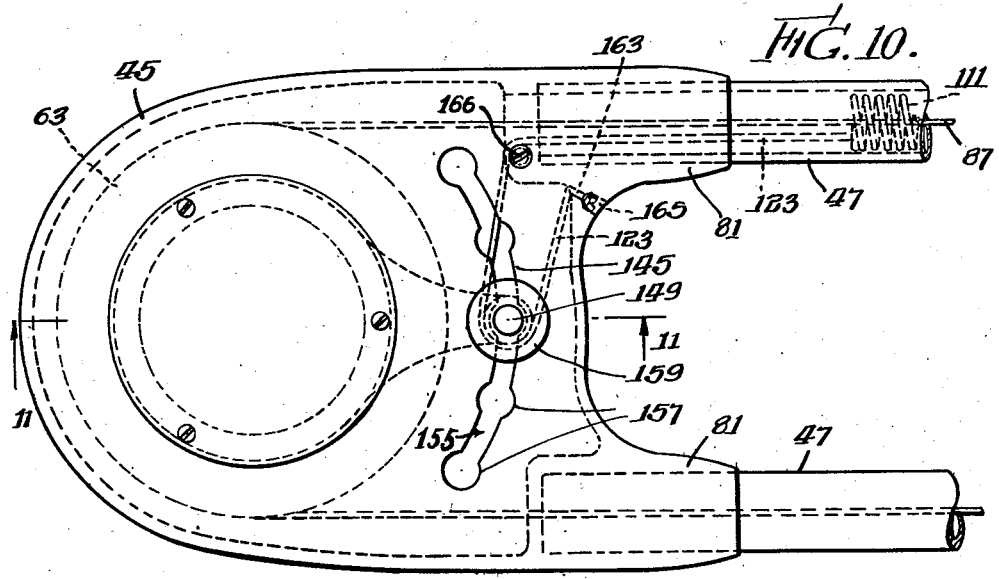
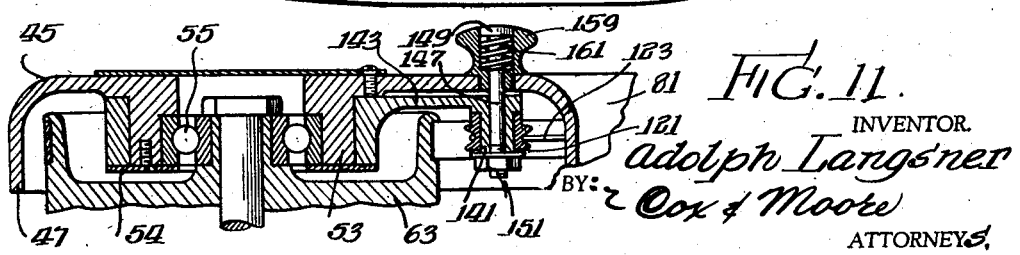

Sept. 19, 1944.  A. LANGSNER  2,358,522
DRAFTING APPARATUS
Filed May 8, 1939  3 Sheets-Sheet 3
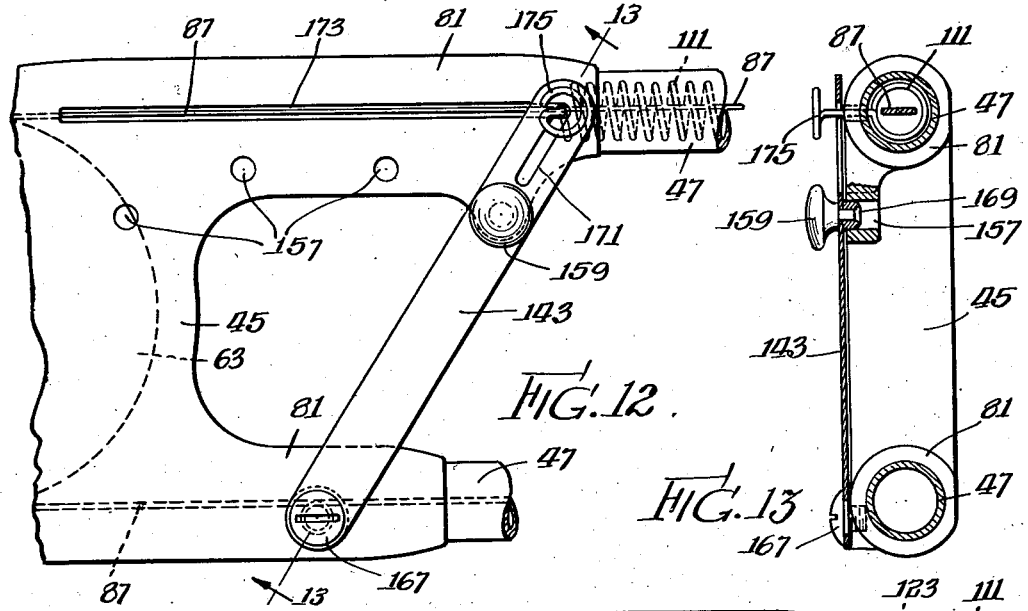
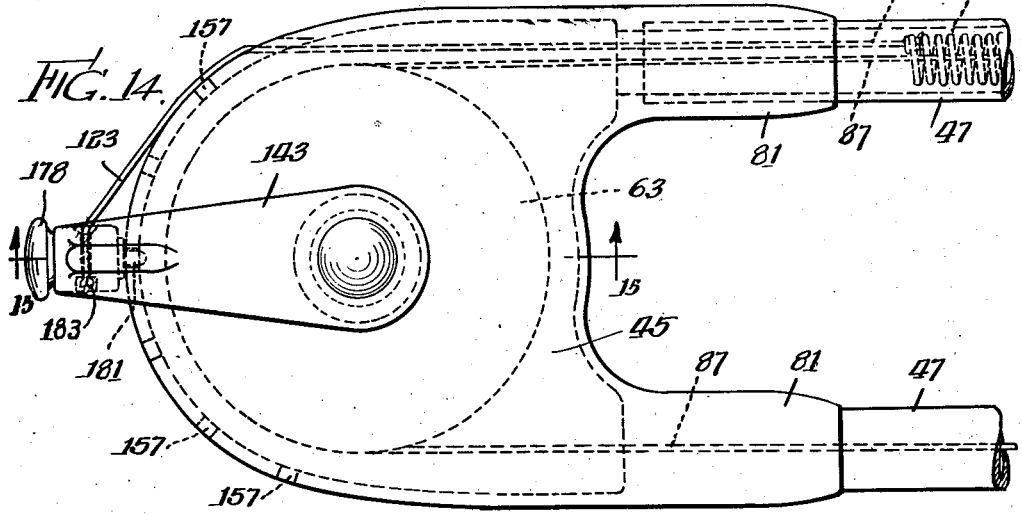
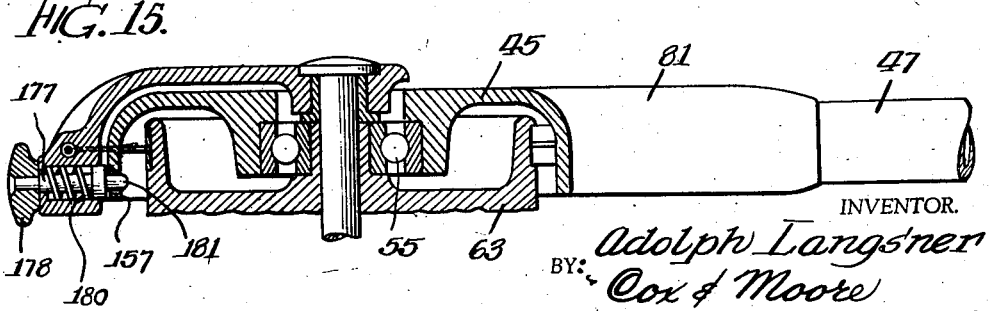
INVENTOR.
Adolph Langsner
BY: Cox & Moore
ATTORNEYS.

Patented Sept. 19, 1944

2,358,522

UNITED STATES PATENT OFFICE 2,358,522

DRAFTING APPARATUS

Adolph Langsner, Chicago, Ill., assignor to Eugene Dietzgen Co., Chicago, Ill., a corporation of Delaware Application May 8, 1939, Serial No. 272,335

30 Claims. (Cl. 33—79)

My invention relates in general to parallel motion devices and more especially to drafting equipment embodying parallel motion mechanism, the invention relating more particularly to a device adapted for attachment on a drawing board or table in order to support a ruling guide element, such as a straight edge, for free and unrestricted movement within a drafting area on the board or table, while maintaining the ruling element in an adjusted relative angular relation with respect to the board or table throughout the movement of the guide element within said drafting area.

An important object of the invention is to provide parallel motion apparatus in which the element supported for parallel movement is carried on a jointed arm, including flexible, endless belt means operating on pulleys at the opposite ends of the arms for maintaining the supported device in a desired alignment, regardless of the movement of the arm.

Another important object resides in providing apparatus of the character mentioned, wherein the relatively movable arms are of simplified construction, each comprising tubular connecting means extending between pulley housings and supporting the housings in spaced relationship whereby an inexpensive, lightweight, and adequately rigid arm construction is provided; a further object being to utilize the tubular means for the purpose of housing and protecting the flexible driving element, while at the same time holding the pulley housings in spaced relationship.

Another important object is to provide yielding means neatly and compactly arranged to normally urge the flexible driving element in one direction on said pulleys; a further object being to utilize a helical spring extending within one of the tubular spacing and enclosing members, with the flexible driving element extending axially through said helical spring, whereby to conserve space and permit the spring and driving element to be snugly enclosed while freely operable within the tubular element.

Another important object is to provide means readily operable to adjust the tension applied on the driving element by the helical spring, it being understood that the spring, in urging the driving member in one direction on the pulleys, tends to rotate the arm about the supported end thereof in one direction whereby to counterbalance the weight of said arm particularly when the device is mounted on a support for movement in a plane tilted from the horizontal; a further important object being to utilize, as tension adjusting means, a manually-operable tensioning element supported on a pulley housing for adjusting movement thereon, including means for anchoring the manually-operable element in adjusted position on the housing.

Another important object is to form the manually-operable element as a crank having a pulley or winding drum thereon for winding a tension element connected with the spring for tensioning the same.

Another important object resides in providing a tiltable lever on the housing and angularly adjustable thereon for the purpose of adjusting spring tension.

Among the numerous other objects and advantages of my present invention is the provision of neat, compact and attractive parallel motion mechanism wherein the weight of moving parts is reduced to a minimum, all of the parts being entirely enclosed and housed against mechanical damage from outside forces and from deterioration through exposure to the atmosphere, the novel structural features of the apparatus, in addition, lending themselves to the provision of an attractive streamlined appearance in the finished article.

The foregoing and numerous other objects, advantages and inherent functions of my present invention will become apparent as the same is more fully understood from the following description which, taken in connection with the accompanying drawings, discloses a preferred embodiment of the invention.

Referring to the drawings,

Figure 1 is a top plan view of parallel motion mechanism embodying my present invention, parts of the apparatus being broken away to illustrate the internal construction thereof;

Figures 2 and 3 are sectional views taken substantially along the lines 2—2 and 3—3, respectively, in Figures 1 and 2, in order to illustrate an improved tensioning means for the driving bands;

Figures 4, 5, 6 and 7, respectively, are enlarged sectional views taken substantially along the lines 4—4, 5—5, 6—6 and 7—7 in Figure 1;

Figure 8 is a sectional view taken substantially along the line 8—8 in Figure 6, to illustrate a preferred manually-operable tensioning means for adjusting yielding counterbalanced means forming a part of the device of my present invention;

Figure 9 is a plan view of the tensioning device shown in Figure 8;

Figures 10, 12 and 14 are plan views showing modified forms of means for adjusting the counter-balancing spring;

Figures 11, 13 and 15, respectively, are sectional views taken substantially along the lines 11—11, 13—13, and 15—15, respectively, in Figures 10, 12 and 14.

To illustrate my invention, I have shown on the drawings parallel motion mechanism comprising means forming a pair of arm elements 31 and 33 connected together for relative rotation about an axis 35 adjacent an end of each arm, means 37 being provided at the opposite end of the arm 31 for anchoring it on a drafting board or table for relative rotation about a stationary axis preferably formed by a stationary pin 39. The end of arm 33, opposite from the pivot 35, carries means 41 for supporting an element 43 for parallel movement, said element, in the illustrated embodiment, comprising drafting guide means adapted to be moved throughout a drafting area on the drawing board or table on which the mechanism is or may be attached.

The arms 31 and 33 are preferably of substantially identical construction and may comprise each a pair of housing elements 45 and a pair of hollow, tubular spacers 47, the opposite ends of which are secured to the housing elements 45 to support the same in spaced-apart relationship. The housing elements of the arm 31 are individually identified by the numerals 30 and 32, while the corresponding elements of the arm 33 are identified by the numerals 34 and 36.

The housing elements 45 preferably are of substantially identical construction for convenient and inexpensive fabrication, and they preferably comprise, generally, shallow casings, each having a rim 49 and a closed end wall 51, the opposite end being open. The end wall 51, within the rim 49, carries an annular flange 53 preferably formed integral with the wall 51 and extending inwardly of said wall in position to form a seat for a bearing 55 of any suitable or preferred construction, and which, as shown on the drawings, may be a roller or ball bearing.

The casings 30 and 32, which are at the opposite ends of the arm 31, as well as the casing 36, which is at the free end of the arm 33, are arranged with their open ends facing downwardly toward the surface on which the device is mounted. The casing 34 at the end of the arm 33, which is secured to the arm 31, is arranged with its open end facing upwardly, opposite the open end of the casing 32, so that the casings 32 and 34 cooperate to form a housing. This housing encloses a pulley 57 having a rim 59 extending in the peripheral portions of the compartment formed by the cooperating casings 32 and 34. The pulley is mounted on a pin 61 and journalled for rotation in the bearings 55 of the casings 32 and 34, the pin 61 serving to hold the casings together by cooperation with said bearings.

It will be noted that the pin 61 has a nut threaded thereon at one end, and that the end wall 51 of the casing 34 is formed with a central opening through which access may be had to said nut.

At the anchored end of the arm 31 the arm is preferably pivotally mounted upon a shaft or pin 39, said shaft being preferably fixed on and forming a part of the clamp means 37 by which the device is or may be fastened upon the drawing board or table. The housing element 30 is journalled on the pin 39 by means of its bearing 55. The pin 39 also carries a pulley 63 extending within the housing element 30 and having a rim 65 extending adjacent and within the rim 49 of the casing. The pulley 63 has a hub fixed on the pin or shaft 39 so that the pulley is held from rotation with respect to the mounting means 39 and the table on which the device is or may be attached.

The open end of the housing 45 may be and preferably is enclosed by suitable cover means 66 supported on the shaft 39, and while such cover means may take any suitable or convenient form and may be formed on or carried by the pulley 63, if desired, I prefer to mount the cover for free rotational movement on the pin 39 so that the casing 30 and cover 66 may form a closed casing around the pulley 63.

In the illustrated embodiment the device or element 43 supported for parallel movement comprises a bracket 67 supporting straight edge elements 69 at right-angles, one with respect to the other, although it is, of course, apparent that the invention is not necessarily limited to the specific character of the supported element 43. Means 41 is provided to mount the supported element 43 upon the casing 16 at the free or swinging end of the arm 33, the means 41 comprising a pulley 71 carried on a pin 73 and journalled for rotation on the housing element 36 by means of the bearing 55 in said housing.

It will be noted that the pin 73 is fast with the pulley 71, the pin having a head extending downwardly of and projecting from the lower, open end of the housing in position to support the bracket 67 which forms a part of the supported element 43. The bracket 67 is carried by the pin 73, and means, including the clamp 75, is provided for adjusting the relative angular relationship of the supported device 43 with respect to the pulley 71 and for locking the parts in a desired adjusted relationship, the angularity of which may be determined on a scale 77 carried by the pulley 71. At its end opposite the head, the pin 73 projects upwardly of the bearing through a central opening formed in the wall 51 of the housing 36, and this end is provided with means for attaching a knob or hand piece 79 to aid in the manipulation of the device. In the illustrated embodiment the hand piece 79 is fastened on the pin 73 against turning movement.

The rim 49 of each of the casings 30, 32, 34 and 36 is or may be formed with a pair of preferably integral projections 81 extending tangentially of the rim 49, said projections on each casing being parallel and spaced apart on opposite sides of the casing. The projections 81 are each formed with a preferably accurately defined seat 83 adapted to snugly receive the end of a spacer tube 47. The bottom of each seat is connected with the interior of the casing on which it is formed, by means of an opening 85 so that when the end of a tube 47 is assembled in the seat 83 the interior of the tube is connected with the interior of the casing in tangential alignment with the rim of the pulley therein.

The arms 31 and 33 are assembled readily by press-fitting the ends of the tubular members 47 into the sockets or seats 83, the tubes forming adequately rigid connection between the casings and serving to maintain the casings in accurately spaced apart relationship, at the same time providing an extremely lightweight arm structure.

It will be noted that the casings 32 and 34 cooperate to form a substantially closed housing for the pulley 57; that the housing 30, in conjunction with the cover means 66, likewise forms a substantial enclosure for the pulley 63; and that the pulley 71 has a portion carrying an outstanding flange 76 that cooperates with the open end of the casing 36 to form an enclosure for the tape carrying portions of the pulley 71.

The rims of the pulleys 63 and 71 are each formed preferably with a single, peripheral groove, while the pulley 57 at the pivotally connected ends of the arms 31 and 33 is formed with a pair of grooves in its rim. The grooves in all of the pulleys 57, 63 and 71, however, are of like width and depth, and are adapted to receive flexible driving means 87 preferably comprising an endless belt in each of the arms 31 and 33. These belts may conveniently comprise lengths of metal tape, the opposite ends of each tape being connected together by fastening means 89 allowing for adjustment so that the flexible driving means may be drawn up to a desired tension on the carrying pulleys.

The tape-like elements forming the flexible driving means may be applied on the pulleys in each arm by threading the same endwise through the open side of the housing element 30, in the case of arm 31, and through the open side of the housing element 36, in the case of the arm 33, before the pulleys 63 and 71 are assembled in place. The tape is passed through one of the tubes 47 toward and around the pulley 57. The flexible elements of both arms 31 and 33 may thus be drawn around the pulley 57 and returned, one through the remaining tube of the arm 31, and the other through the remaining tube of the arm 33, back to the starting point. It will be noted that the pulley chamber in each casing extends into the base portions of the projections 81, thereby providing openings accessible from the under side of the arm assembly to facilitate drawing the flexible members through the tubes 47 and around the pulleys in applying the same. In addition, openings 82 may, if desired, be formed in the top of the housings for this purpose. After the flexible driving means have thus been assembled in each of the arms 31 and 33, the abutting ends of each may be connected together by the connectors 89. Then the pulleys 63 and 71 may be assembled in place.

The connectors 89 may be of any suitable or preferred construction, but, as shown in the drawings, the same may each comprise a stem 91 having a diametral slot 93 at one end adapted to receive an end of the flexible driving member 87 which is secured in the slot 93 by rivets 95 or other suitable fastening. The stem 91 has a lug 99 formed with an opening to receive one end of a spring 101, the opposite end of which is connected on a lug 98 formed in the end of a threaded stem 96 formed with a diametral slot 94 to receive an adjustable connector piece 102. This piece is of plate-like form adapted to slidingly fit the slot 94 and it has a necked portion 103 of width not greater than the diameter of the stem 96 so that a nut 105 on the stem 96 may encircle the necked portion 103. The connecting piece 102 has a head 107 extending outwardly of the slot 96 on opposite sides of the stem in position to bear upon one end of the nut 105. Consequently, after the driving bands 87 have been assembled in the arms 31 and 33, as heretofore described, the abutting ends of the bands may be connected together simply by attaching one of said ends in the slot 93 and attaching the other end on the connector piece 102. This done, it is merely necessary to thread the nut 105 on the stem 96 and draw the same down until a desired tension is obtained in the driving element, and the nut 105 may have radial sockets therein adapted to receive a tool to facilitate the tightening of the nut on the stem. Tightening of the nut may be readily accomplished through the opening at the base of the projections 81.

It will be seen that as the nut is tightened, the spring 101 will be placed in tension to any desired degree within limits determined by the length of the stem 96 and the position of the nut 105 thereon. The spring 101 will substantially maintain the band 87 under resilient tension at all times and will automatically compensate for any slight stretching of the band 87 that may occur while the device is in service.

The flexible driving belts 87 are tightened sufficiently to provide appreciable frictional grip upon the pulleys. Since the pulley 63 is held against rotation with respect to the drawing board or table, it will hold the flexible connector 87 of the arm 31 because of the frictional driving engagement between said pulley 63 and the flexible connector. As the arm 31 is swung about the pivot pin 39, however, the driving connection between the flexible connector of the arm 31 and the pulley 57 will cause said pulley to rotate in the casing 32 through an angular displacement equal at all times to the angular movement of the arm 31 about the pivot pin 39. In like fashion, the flexible connector 87 of the arm 33, through its frictional driving engagement on the pulley 57 and on the pulley 71, insures that the angular movement of the pulley 71 with respect to the housing 36 is at all times equal to the angular movement of the housing 34 with respect to the pulley 57, thereby insuring that the supported element 43 is at all times maintained in an adjusted, angular relationship with respect to the board or table on which the device is mounted, regardless of the movement of the arms 31 and 33. The desired angular relationship, of course, may be adjusted by manipulating the means 41, including the clamp 75, as is well understood in parallel motion mechanism.

The device of my present invention is adapted for use on drawing boards and tables which may be inclined or tilted more or less from horizontal position. When used on a tilting board, a device of the character described will have a tendency to slide, under the influence of gravity, downwardly on the board, the arm 31, as shown in Figure 1, tending to rotate in counterclockwise direction about the anchored pivot 39, and the arm 33 tending to rotate in clockwise direction, as shown in Figure 1, about the pivot 61. In order to counterbalance this tendency to slide, I provide resilient counterbalancing means cooperatively connected between one or both of the belts 87 and the frame on which mounted. The counterbalancing means is arranged to apply a yielding and adjustable bias upon the frames 31 or 33 or both, whereby to resist the turning movement of the arms, under the influence of gravity, on a tilted support.

To this end, I prefer to provide a resilient spring 111 connected at one end on the belt 87, as by means of a hook 113 carried by the tightening device 89, the hook 113 being preferably secured in the slot 93 of the stem 91. The other end of the spring 111 is adjustably secured on the tilting frame, preferably at one of the housings 45 at an end of the frame, and I provide manually operable adjusting means for varying the tension of the counterbalancing means 111, whereby readily to condition the device to counterbalance the slipping tendency of the arms when mounted on a tilted support.

An important feature of my present invention is the arrangement of the resilient tensioning means neatly and compactly within the tubular members 47. To this end, the resilient tensioning means may comprise helical springs 111, one for each of the arms 31 and 33. This helical spring preferably has an internal diameter appreciably greater than the largest cross-sectional dimension of the flexible driving element 87 so that said spring may be assembled in position encircling a portion of the driving element, without, however, binding upon the element or interfering in its operation. The spring 111 also is of a size to fit freely within one of the spacing tubes 47 without binding.

The counterbalancing spring means 111 may be arranged in either of the arms 47 of said frame, providing, however, that the spring is arranged to exert tension on the band 87 in a direction to urge rotation of the arm opposite to that in which it tends to turn under the influence of gravity on a tilted support.

The spring 111 may be arranged in the upper arm 47, as indicated in Fig. 1 of the drawings, and, as shown more particularly in Figures 8-15, the spring 111 may be connected with adjusting means on the pulley housing 45 at the swinging end of the arm 31. The spring means 111, however, may equally well be arranged in the lower arm 47 of the frame 31 and attached on the housing 45 at the pivoted end of the frame 31. Likewise, if desired, counterbalancing spring means may be applied in the arm 33, although the necessity for counterbalancing the swinging arm 33 is not as great as the need for balancing the arm 31, and consequently counterbalancing means will ordinarily be omitted from the arm 33.

As shown in Figures 8, 9, 10 and 11, the adjusting means may comprise a fitting forming a pulley or drum 121 movably mounted on the frame 45 and adapted to receive a flexible connecting member 123, one end of which is attached to the spring 111, as by forming a knot in the end of the member 123 and clamping the knot between the coils of the spring 111.

As shown in Figures 8 and 9, the drum 121 is formed with a slot 125 adapted to receive the knotted end of the member 123, and the drum 121 is formed with a stem 127 journalled in the housing 45 and having an end extending outwardly thereof. Said outwardly extending end passes through a washer 129 and carries a flexible spring arm 131 extending therefrom and carrying a knob 133, whereby the drum 121 may be turned.

Outwardly of the arm 131 the projecting end of the stem 127 preferably carries a rigid plate 135 extending outwardly and opposite the resilient member 131 to form a guard therefor.

The knob 133 provides a latching projection 137 on the side of the arm 131 facing the wall of the housing 45 which is provided with a plurality of openings 139 preferably on opposite sides of the stem 127. The openings 139 form latch keepers for receiving the projection 137, the resilient arm 131 normally urging the projections into keeper-engaging position in the openings 139.

By drawing the knob 133 outwardly of the housing 45 and into engagement with the guard 135, the projection 137 may be released from the keeper, whereupon the winding drum 121 may be turned in order to wind the member 123 thereon and thus tension the spring 111 to a desired extent. The device may be latched in any of the openings 139 to maintain the spring at a desired tension.

As shown in Figures 10, 11, 12, 13, 14 and 15, the tension adjusting means may comprise an arm or frame tiltably mounted on the housing 45 for movement to a plurality of adjustable spring tensioning positions 157. This is accomplished in each case by providing an arm 143 tiltably mounted on the housing 45 and having manually operable means 159 on the arm for moving and latching the same on the housing 45 in a selected one of the plurality of latched adjusting positions 157; and means is provided for attaching the spring 111 on the member 143 whereby to tension the spring in accordance with the movement of said arm.

The arm 143, in Figures 10, 11, 14 and 15, is mounted for tiltable movement about the axis of the pulley enclosed in the housing 45.

As shown in Figures 10 and 11, the pulley 121 is rotatably mounted on a frame stem 141 forming a part of a frame 143 which is journalled on the outer walls of the annular portion 53 of the casing 45, being held in place by means of an annular retaining plate 54 which may also serve to hold the bearing 55 in place on the housing 45. The pulley 121 is thus supported for movement with the frame along a curved path 145, the center of curvature of which is the axis of the bearing 55.

The pulley 121 is held on the stem 141 by means of a pin 147 having a headed end 149 and a threaded end 151. The pin 147 is mounted in a channel formed through the stem 141 and is assembled therein with the threaded end extending below the pulley 121 which is retained in place on the stem 141 by means of a holding nut 153 or other suitable holding means.

The headed end of the stem projects outwardly through a curved slot 155 formed in the housing 45, said slot extending opposite and coinciding with the curved path of movement of the pulley, said slot 155 being enlarged at intervals, as at 157, to form latch keepers for receiving a latch formed as a knob 159 slidable on the headed end of the stem 147 and normally urged by means of a spring 161 on said stem in a direction to latchingly engage the latch knob 159 in the keeper openings 157.

The tension element 123 passes around a guide pin 166 and thence around the pulley 121 and is anchored at its end on the frame 45 as by passing said end through a perforation 163 formed in a wall of the housing 45 and knotting the end of the member 123 outwardly of said casing, the knot being received and concealed in a countersunk opening 165 forming a knot-receiving seat.

In the embodiment illustrated in Figures 10 and 11, the slot 155 provides five latching positions 157, the tension of the spring being adjusted by lifting the latching knob 159 and turning the frame 143 until the desired tensioned position is reached by the knob, whereupon the knob may be latched in the selected keeper opening 157.

As shown in Figures 12 and 13, the arm 143 comprises a sheet metal plate pivotally secured on the housing 45, as by means of the screw 167, to swing in an arc opposite the housing portion 81 at the end of the spring 111. The arm 143 is of resilient character and carries the knob 159 thereon, which knob has a latching projection at 169 in position to engage any one of a plurality of openings 157 formed in the casing portion 81.

The arm 143 also is provided with a slot 171 in position to sweep over a slot 173 formed in the housing portion 81. The end of the spring 111 is built to extend upwardly through the slots 171 and 173 and is curled, as at 175, to retain the same in the slots whereby the arm 143 is directly connected on the spring 111 which may be tensioned in accordance with the adjusted and latched position of the arm 143 on the frame.

As shown in Figures 14 and 15, the frame 143 may be pivotally mounted on the pin or stem on which the casing 45 is supported. The arm 143 may extend in position overlying the closed end of the housing 45 and around the peripheral margin thereof in which the latching openings 157 may be formed. The overhanging end of the arm 143 is preferably provided with a latch pin 177 having a head or knob 178 and a latching end 181 in position to engage the detent openings 157.

Spring means 179 is provided on the arm 143 in position to normally urge the stem 177 in a direction to engage the detent end 181 thereof in said openings. The arm may be released for adjustable movement by drawing the knob 178 outwardly, and said arm contains a channel and a knob seat 183 on which the end of the flexible tensioning member 123 may be attached.

The device of my present invention has several advantages, including simplicity of construction of the arms 31 and 33, lightness in weight of moving parts; the provision of simple, easily operated means for tensioning the flexible driving belts 87 and the housing thereof within the spacing tubes 47, thereby effectively enclosing the same and improving the appearance of the apparatus; the provision of counterbalancing springs 111 and the neat, compact arrangement thereof around the flexible driving belts within the spacing tubes 27; and also the simplified arrangements for adjusting the tension of the counterbalancing springs.

It is thought that the invention and numerous of its attendant advantages will be understood from the foregoing description, and it is obvious that numerous changes may be made in the form, construction and arrangement of the several parts without departing from the spirit or scope of the invention, or sacrificing any of its attendant advantages, the form herein described being a preferred embodiment for the purpose of illustrating the invention.

The invention is hereby claimed as follows:

1. In a parallel motion drafting device, in combination, an arm, a pulley at each end thereof, means permitting relative movement between the arm and the pulleys, respectively, an endless belt about the pulleys, and tension means extending from the belt to the arm.

2. In a parallel motion apparatus of the character mentioned, means comprising an arm having pulleys spaced apart thereon, flexible driving means on said pulleys, a spring connected on said flexible means and adjustably anchored on said arm under tension to urge said flexible means in one direction on said pulleys, manually operable means to adjust the anchorage of said spring, comprising a member shiftable on said arm and connected with said spring, and means to secure said shiftable member in adjusted position on said arm.

3. In a parallel motion apparatus of the character mentioned, means comprising an arm having pulleys spaced apart thereon, means to support one of said pulleys whereby the arm is swingable about the axis of said pulley, drafting guide support means carried by the other pulley, flexible driving means on said pulleys, and helical spring means encircling said driving means and normally urging said driving means in one direction on said pulleys.

4. In a parallel motion apparatus of the character mentioned, means comprising an arm having pulleys spaced apart thereon, means to support one of said pulleys whereby the arm is swingable about the axis of said pulley, drafting guide support means carried by the other pulley, flexible driving means on said pulleys, and helical spring means encircling said driving means and normally urging said driving means in one direction on said pulleys, comprising spring means connected on said driving means and anchored under tension, whereby the spring may resiliently urge the driving means in one direction.

5. In a parallel motion apparatus of the character mentioned, means comprising an arm having pulleys spaced apart thereon, means to support one of said pulleys whereby the arm is swingable about the axis of said pulley, drafting guide support means carried by the other pulley, flexible driving means on said pulleys, and means normally urging said driving means in one direction on said pulleys, comprising spring means connected on said driving means and anchored under tension, whereby the spring may resiliently urge the driving means in one direction, and means comprising a shiftable member on said arm and connected with said spring means for adjusting the tension of said spring means.

6. In a parallel motion apparatus of the character mentioned, means comprising an arm having pulleys spaced apart thereon, means to support one of said pulleys whereby the arm is swingable about the axis of said pulley, drafting guide support means carried by the other pulley, flexible driving means on said pulleys, a spring connected on said flexible means and adjustably anchored on said arm under tension to urge said flexible means in one direction on said pulleys, and manually operable means comprising a shiftable member on said arm and connected with said spring means to adjust the anchorage of said spring whereby to vary the spring tension exerted on said flexible means.

7. In apparatus of the character described, a pair of frames each comprising a pair of spaced-apart housing portions and tubular spacing members therebetween, means forming a pivotal connection between said frames with one of the housing portions of one frame co-operating with one of the housing portions of the other frame to form a pulley enclosure at said connection, a common pulley in said enclosure, said common pulley being angularly movable with respect to both frames about the axis of said pivotal connection therebetween, the other housing portion of one of said frames enclosing an anchoring pulley, and means to attach said anchoring pulley on a support whereby to carry said frames for relative angular movement with respect to the anchoring pulley, flexible driving means extending in said one frame on and between and drivingly interconnecting the anchoring pulley and said common pulley, said driving means having portions extending within said tubular spacing members, the other housing of said other frame enclosing a swinging pulley, a flexible driving member in said other frame and extending within the tubular members thereof, and drivingly connecting the common and the swinging pulleys within the housings at the opposite ends of said other frame, and means supported on said swinging pulley for parallel movement therewith.

8. In apparatus of the character described comprising a frame carrying, in spaced relationship thereon, a pair of transmission members forming supports angularly movable with respect to the frame, and flexible driving means including an elongated tension member on and extending between said supports and drivingly interconnecting the same, said frame providing a tubular duct between said supports for housing portions of said tension member between said supports, the combination, with said tension member and frame, of a helical spring encircling a portion of said tension member within said duct and interconnected between said tension member and said frame to normally urge the driving means in one direction on said supports.

9. In a parallel motion apparatus of the character mentioned, the combination with means comprising an arm having pulleys spaced apart thereon, flexible driving means on said pulleys, and a spring connected with said flexible means and anchored on said arm to urge said flexible means in one direction on said pulleys, of means to adjust the anchorage of said spring on the arm, comprising a member shiftable on said arm and connected with said spring and means to secure said shiftable member in adjusted position on said arm comprising manually operable detent latch means operatively connected between said arm and said shiftable member.

10. In a parallel motion apparatus of the character mentioned, the combination with means comprising an arm having pulleys spaced apart thereon, flexible driving means on said pulleys, and a spring connected with said flexible means and anchored on said arm to urge said flexible means in one direction on said pulleys, of means to adjust the anchorage of said spring on the arm, comprising a member shiftable on said arm and connected with said spring and means to secure said shiftable member in adjusted position on said arm comprising latch means movable on the shiftable member and keeper means formed on said arm, said latch means being manually operable to release said shiftable member for movement on the arm and to lock the same with said keeper means.

11. In a parallel motion apparatus of the character mentioned, the combination with means comprising an arm having pulleys spaced apart thereon, flexible driving means on said pulleys, and a spring connected with said flexible means and anchored on said arm to urge said flexible means in one direction on said pulleys, of means to adjust the anchorage of said spring on the arm, comprising a member shiftable on said arm and connected with said spring and means to secure said shiftable member in adjusted position on said arm comprising a member pivoted on said arm and carrying spring pressed latch means adapted to lock in keepers formed in said arm.

12. In a parallel motion apparatus of the character mentioned, the combination with means comprising an arm having pulleys spaced apart thereon, flexible driving means on said pulleys, and a spring connected with said flexible means and anchored on said arm to urge said flexible means in one direction on said pulleys, of means to adjust the anchorage of said spring on the arm, comprising a member shiftable on said arm and connected with said spring and means to secure said shiftable member in adjusted position on said arm comprising manually turnable means on said arm for shifting said member, and manually operable latch means on said turnable means for securing the same in adjusted position on said arm.

13. In a parallel motion apparatus of the character mentioned, means comprising an arm having pulleys spaced apart thereon, means to support one of said pulleys whereby the arm is swingable about the axis of said pulley, drafting guide support means carried by the other pulley, flexible driving means on said pulleys, a spring connected on said flexible means and adjustably anchored on said arm under tension to urge said flexible means in one direction on said pulleys, and manually operable means to adjust the anchorage of said spring, whereby to vary the spring tension exerted on said flexible means, comprising a winding drum on said arm, a manually operable crank for turning said drum, a flexible winding member on said drum and connected with said spring, detent means formed on said crank and keeper means formed on said arm in position to receive said detent means in any one of a number of adjusted positions of said crank for latching the crank against rotation of the drum under the influence of said spring.

14. A drafting machine comprising a fixed head, a work head, link mechanism connecting the fixed head and the work head, each link of said link mechanism comprising pulleys in spaced relation, a flexible band passing around the pulleys and a member rotatable around a pulley of a link and means to counter-balance the weight of the links comprising a spring fixed at one end to said member rotatable around a pulley and connected to counter-balance the weight of the links.

15. In a parallel motion apparatus of the character mentioned, the combination with means comprising an arm member, pulleys spaced apart thereon, flexible driving means on said pulleys, a spring connected to said flexible means and anchored on said arm member, whereby to urge said flexible means in one direction on said pulleys, of means to adjust the anchorage of said spring on said arm member, comprising an adjustable member shiftable on said arm member and connected with said spring, and latch means to secure said adjustable member in adjusted position on said arm member, said latch means comprising keeper means on one of said members and a releasable latch element on the other member.

16. In a parallel motion apparatus of the character mentioned, the combination with means comprising an arm having pulleys spaced apart thereon, flexible driving means on said pulleys, and a spring connected with said flexible means and anchored on said arm to urge said flexible means in one direction on said pulleys, of means to adjust the anchorage of said spring on the arm, whereby to alter the spring tension exerted on said flexible means, comprising a shiftable member rotatable on said arm about the axis of one of said pulleys and connected with said spring, and means to secure said member in angularly adjusted position with respect to the axis of said pulley, comprising manually operable latch means operatively connected between said arm and said shiftable member.

17. In a parallel motion apparatus as set forth in claim 16, wherein said manually operable latch means comprises a detent movably mounted on said shiftable member, and keeper means formed on said arm in position to receive said detent in any one of a number of angularly adjusted positions of said shiftable member.

18. In a parallel motion apparatus of the character mentioned, the combination with means comprising an arm having pulleys spaced apart thereon, flexible driving means on said pulleys, and a spring connected with said flexible means and anchored on said arm to urge said flexible means in one direction on said pulleys, of means to adjust the anchorage of said spring on the arm, whereby to alter the spring tension exerted on said flexible means, comprising a lever pivoted on said arm and having a swingable portion connected with said spring to adjust the same longitudinally, and manually operable latch means co-operatively connected between the arm and said lever to anchor the same in adjusted position on the arm.

19. In a parallel motion apparatus as set forth in claim 18, wherein said manually operable latch means comprises a detent on said lever, and keeper means formed on said arm in position to receive said detent in any one of a number of adjusted positions of said lever.

20. In a parallel motion apparatus of the character mentioned, means comprising an arm having pulleys spaced apart thereon, means to support one of said pulleys whereby the arm is swingable about the axis of said pulley, drafting guide support means carried by the other pulley, flexible driving means on said pulleys, a spring connected on said flexible means and adjustably anchored on said arm under tension to urge said flexible means in one direction on said pulleys, and manually operable means to adjust the anchorage of said spring, whereby to vary the spring tension exerted on said flexible means, comprising a winding drum on said arm, a manually operable crank for turning said drum, a flexible winding member on said drum and connected with said spring, detent means formed on said crank, said crank comprising a blade of resilient material, and keeper means on said arm in position to receive said detent means for latching the crank on the arm.

21. In a parallel motion apparatus of the character mentioned, the combination with means comprising an arm having pulleys spaced apart thereon, flexible driving means on said pulleys, and a spring connected with said flexible means and anchored on said arm to urge said flexible means in one direction on said pulleys, of means to adjust the anchorage of said spring on the arm, whereby to alter the spring tension exerted on said flexible means, comprising a shiftable member rotatable on said arm about the axis of one of said pulleys and connected with said spring, and means to secure said memebr in angularly adjusted position with respect to the axis of said pulley, comprising manually operable spring urged latch means on said shiftable member, said arm having a series of detent openings spaced apart on the arc of a circle centering on said axis in position to latchingly receive the latch means.

22. In a parallel motion apparatus of the character mentioned, the combination with means comprising an arm having pulleys spaced apart thereon, flexible driving means on said pulleys, and a spring connected with said flexible means and anchored on said arm to urge said flexible means in one direction on said pulleys, of means to adjust the anchorage of said spring on the arm, whereby to alter the spring tension exerted on said flexible means, comprising a lever pivoted on said arm and having a swingable portion connected with said spring to adjust the same longtiudinally, said arm having a slot extending longitudinally of the spring and said swingable portion overlying said slot, said spring having a portion extending through said slot and connected to said swingable portion, and manually operable latch means co-operatively connected between the arm and said lever to anchor the same in adjusted position on the arm.

23. In apparatus of the character described comprising a frame carrying, in spaced relationship thereon, a pair of transmission members forming supports angularly movable with respect to the frame, flexible driving means comprising an elongated tension member on and extending between said supports and drivingly interconnecting the same, said frame providing a tubular duct between said supports for housing portions of said tension member between said supports, and means interconnecting the opposed ends of said tension member to form a continuous band encircling said supports, the combination, with said tension member and frame, of a helical spring encircling a portion of said band and connected thereto at one end of the spring, the other end of the spring being attached on said frame at one end of said duct.

24. In apparatus of the character described, a frame carrying, in spaced relationship thereon, a pair of transmission members forming supports angularly movable with respect to the frame, flexible driving means comprising an elongated tension member on and extending between said supports and drivingly interconnecting the same, said frame providing a substantially tubular duct between said supports for housing portions of said tension member between said supports, said tension member comprising a band having abutting end portions, and adjustable means to adjust the tension in said tension member, said adjustable means forming a spring mount, and a helical spring encircling a portion of said band within said duct and connected at one end on said spring mount whereby to normally urge the driving means in one direction with respect to said supports.

25. In apparatus of the character described including a frame carrying, in spaced relationship thereon, a pair of transmission members forming supports angularly movable with respect to the frame, and flexilbe driving means comprising an elongated tension member on and extending between said supports and drivingly interconnecting the same, said frame providing a tubular duct between said supports for housing portions of said tension member between said supports, the combination of means for adjusting the tension in said tension member between said supports comprising a stem attached on one end of said tension member and having a threaded portion provided with a diametral slot, means on the opposite end of said tension memebr including a necked portion adapted to extend in said diametral slot, and a nut on said necked portion and adapted for threaded engagement on the threaded portion of said stem.

26. In apparatus of the character described comprising a frame carrying, in spaced relationship thereon, a pair of transmission members forming supports angularly movable with respect to the frame, flexible driving means including an elongated tension member on and extending between said supports and drivingly interconnecting the same, said frame providing a tubular duct between said supports for housing portions of said tension member between said supports, and means interconnecting the opposed ends of said tension member to form a continuous band encircling said supports, the combination, with said tension member and frame, of a helical spring encircling a portion of said band and connected thereto at one end of the spring, the other end of the spring being attached on said frame at one end of said duct, said interconnecting means comprising a stem attached on one end of said tension member and having a threaded portion provided with a diametral slot, means on the opposite end of said tension member including a necked portion adapted to extend in said diametral slot, and a nut on said necked portion and adapted for threaded engagement on the threaded portion of said stem.

27. In apparatus of the character described, a frame carrying, in spaced relationship thereon, a pair of transmission members forming supports angularly movable with respect to the frame, flexible driving means comprising an elongated tension member on and extending between said supports and drivingly interconnecting the same, said frame providing a tubular duct between said supports for housing portions of said tension member between said supports, said tension member comprising a band having abutting end portions, and adjustable means interconnecting said abutting end portions and operable to adjust the tension in said tension member between the supports, said adjusting means comprising a stem element attached on one end portion of said band and having a threaded portion provided with a diametral slot, means forming a clamp element on the other end portion of said band for adjustably receiving said stem, one of said elements providing a spring mount, and a helical spring encircling a portion of said band within said duct and connected at one end on said spring mount and at its other end on said frame whereby to normally urge the driving means in one direction with respect to said supports.

28. In a parallel motion apparatus of the character mentioned, an arm comprising a pair of housings adapted each to at least partially enclose a pulley, said housings being formed on opposite sides thereof, each with a pair of parallel, spaced-apart sockets in position extending tangentially with respect to the pulley in said housing, a pair of tubular spacing members, each fitted at one end in a socket of one housing and at the other end in a socket of the other housing, whereby said tubular members maintain the spaced-apart relationship of the housings, flexible driving means extending on and between said pulleys and housings within said tubular members, said flexible driving means comprising a strip having interconnected ends to form a continuous band, and means at said interconnected ends for adjusting the length of said band whereby to adjust the tightness thereof on said pulleys, comprising a stem attached on one end of said strip and having a threaded portion provided with a diametral slot, means on the opposite end of said strip including a necked portion adapted to extend in said diametral slot, and a nut on said necked portion and adapted for threaded engagement on the threaded portion of said stem.

29. In apparatus of the character described, a frame, a pair of transmission members angularly movable on the frame, means drivingly interconnecting said transmission members comprising a band having abutting end portions extending therebetween, adjustable means interconnecting said abutting end portions for adjusting the tension of said tension member between said transmission members, said adjustable means comprising a stem element attached on one of the end portions of said band and having a threaded portion provided with a diametral slot, a mounting element on the other end portion of said band comprising a necked portion formed to extend in said diametral slot, a nut on said necked portion adapted for threaded engagement on the threaded portion of said stem, means forming a hook on one of said elements, and a helical spring encircling a portion of said band and connected at one end on said hook and at the other on said frame in position to normally urge said tension member in one direction on said transmission members.

30. In a parallel motion apparatus of the character mentioned, an arm comprising a pair of housings adapted each to at least partially enclose a pulley, said housings being formed on opposite sides thereof, each with a pair of parallel, spaced apart sockets in position extending tangentially with respect to the pulley in said housing, a pair of tubular spacing members, each fitted at one end in a socket of one housing and at the other end in a socket of the other housing, whereby said tubular members maintain the spaced apart relationship of the housings, and flexible driving means extending on and between said pulleys and housings within said tubular members, said flexible driving means comprising a continuous band on said pulleys, and a helical spring encircling a portion of said band within one of said tubular members and interconnected between said band and said arm to normally urge the driving means in one direction on said pulleys.

ADOLPH LANGSNER.